Patented Nov. 2, 1948

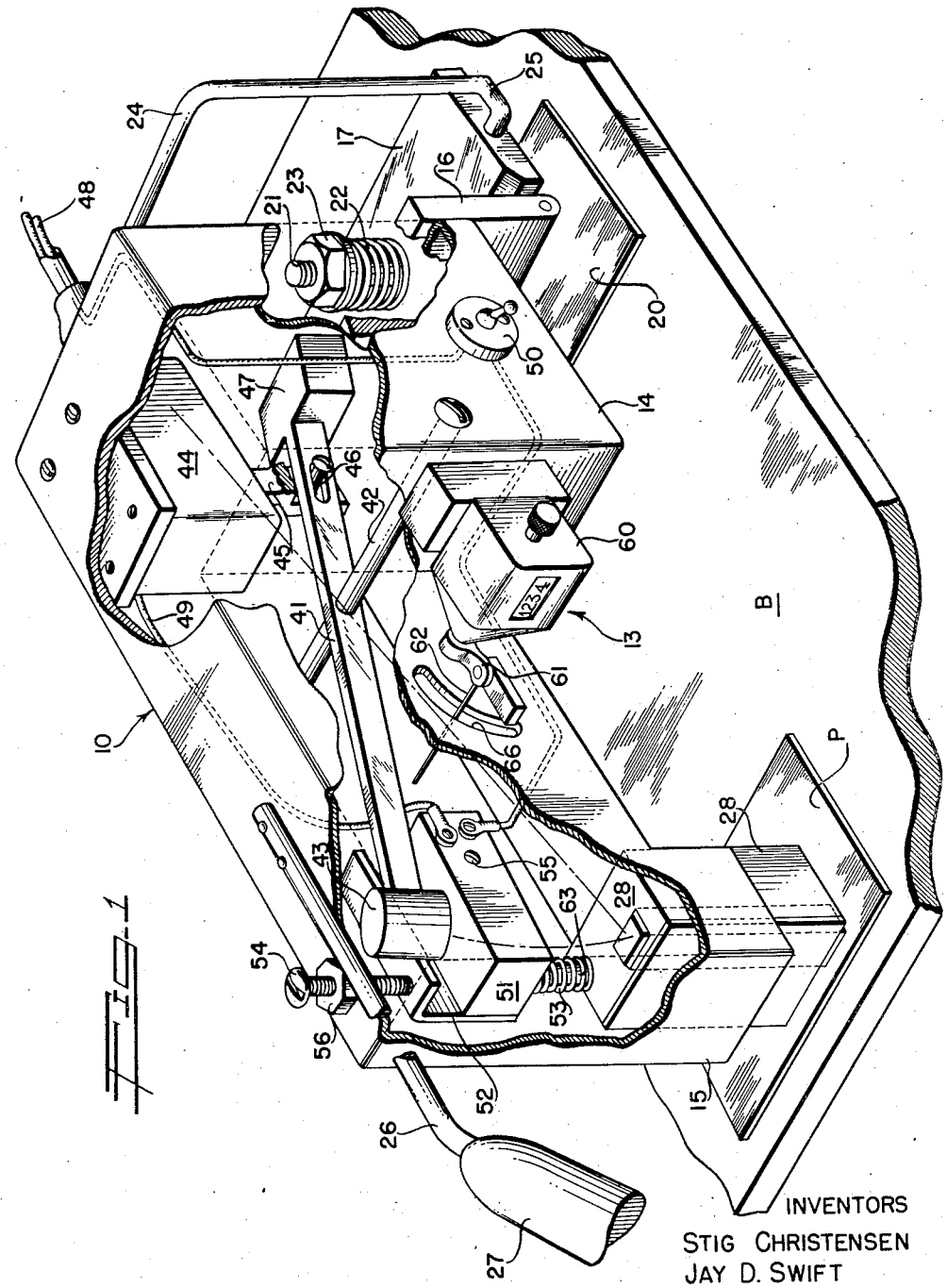

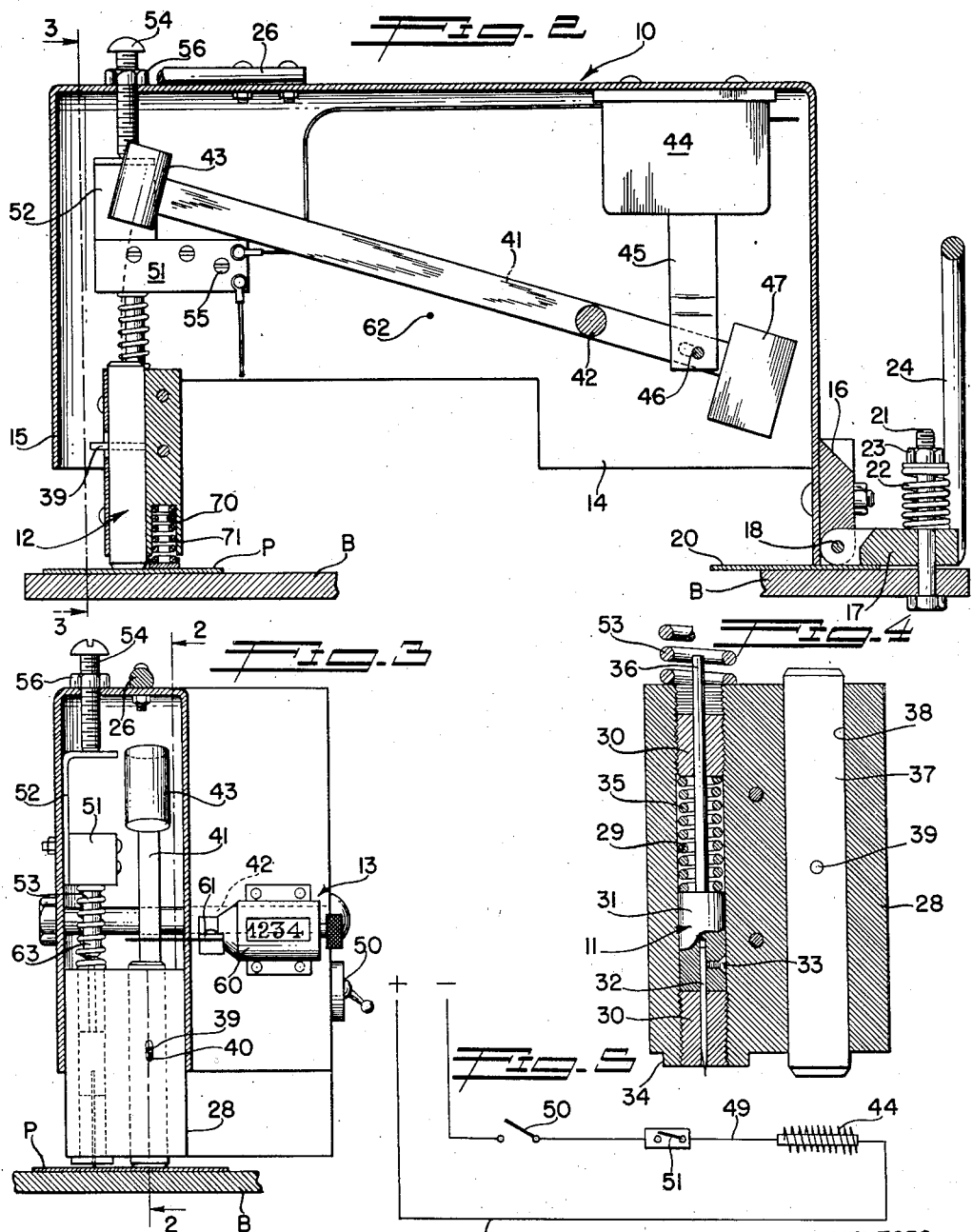

2,452,833

UNITED STATES PATENT OFFICE 2,452,833

HARDNESS TESTING DEVICE

Stig Christensen, Los Angeles, William G. Rosenberg, Glendale, and Jay D. Swift, San Fernando, Calif., assignors to Lockheed Aircraft Corporation, Burbank, Calif.

Application December 20, 1945, Serial No. 636,158

7 Claims. (Cl. 73—81)

Our invention relates to hardness testing devices and relates more particularly to manually operated hardness testers of the type wherein an indentation point is forced into the specimen or material being tested to indicate the hardness thereof.

Hardness testing devices have been introduced in which the depth of penetration of a point into the work is measured to indicate the hardness of the material. In one class of such devices the inspector applies manual pressure to the instrument and reads the test indication on a dial or other indicating means. If the hardness is up to standard, the work part is stamped with an inspection stamp and later the tested parts are counted. There is considerable chance for human error in reading the test indications and in carrying on the stamping and counting of the parts. Furthermore, the three distinct operations of testing, stamping and counting are time consuming and therefore costly.

A general object of this invention is to provide a simple, readily operated manual hardness testing device which accurately tests the hardness of the work parts and stamps and counts the acceptable parts, performing these acts in a single brief operation. The manual pressure applied to the handle of the instruments actuates the hardness testing penetrating point, which in turn conditions the stamping and counting means for operation in the event the work part is of the proper hardness. There is no chance for error in stamping or counting the parts, because they are automatically stamped and counted in the single operation and only in the event they are of the correct hardness. The separate steps of stamping and counting the parts are entirely avoided, and the full sequence of testing, stamping and counting is performed upon the application of manual pressure to the handle.

Another object of the invention is to provide a hardness testing device of the character referred to which may be in the form of a small, compact, manually portable unit adapted to be used on a conventional workbench. The invention may be embodied in a lightweight device which can be installed and operated without requiring special mountings or bench attachments.

It is another object of this invention to provide a device of the class referred to which is adapted to test parts of widely varied sizes, thicknesses, etc., being provided with an effective adjustment to facilitate the testing of such parts.

It is a further object of the invention to provide a hardness testing device of the character mentioned that is adjustable to test within different selected hardness ranges.

Other objectives and advantages of the invention become apparent from the following detailed description of a typical embodiment wherein reference will be made to the accompanying drawing in which:

Figure 1 is a perspective view of the device of this invention with portions of the case broken away to show the internal mechanism;

Figure 2 is a vertical detailed sectional view of the devices mounted on a support, taken as indicated by line 2—2 on Figure 3;

Figure 3 is a sectional view taken substantially as indicated by line 3—3 on Figure 2;

Figure 4 is an enlarged vertical detailed sectional view of the penetrating point means, showing the adjacent stamp in elevation; and Figure 5 is a schematic wiring diagram of the electrical circuit included in the device.

Our improved hardness testing machine may be said to comprise generally a case 10, spring loaded work penetrating means 11 carried by the case, and stamping means 12, and counting means 13 in the case automatically operated in response to actuation of the means 11.

The case 10 serves to carry and contain the various other elements of the device and may be a generally rectangular box-like structure. As best illustrated in Figures 1 and 2, the case 10 is provided at its rear end with a broadened downwardly projecting extension 14, and at its forward end with a similar but somewhat shallower extension 15. The lower side of the case 10 may be left open. In accordance with the invention the entire case 10 is arranged to be pivoted or swung downwardly to actuate the penetrating means 11, and a special mounting arrangement is provided to maintain the case in a normally horizontal position when adjusted to test work parts varying considerably in thickness. A hinge plate 16 is secured to a downwardly extending portion of the rear wall of the case 10, and a mounting plate 17 is secured to the plate 16 by a hinge connection 18. The mounting plate 17 is adapted to bear flatly against the upper surface of a workbench B, or the like, or against a shim 20 on the bench. Spaced bolts 21 extend upwardly through openings in the bench top and continue through openings in the plate 17. Springs 22 surround the upper portions of the bolts 21 and are arranged under compression between the upper side of the mounting plate 17 and nuts 23 threaded on the bolts. The springs 22 urge the plate 17 downwardly against the surface of the bench B or the shim 20, as the case may be. As clearly illustrated in Figure 1, a handle 24 is attached to the opposite ends of the mounting plate 17 and has rearwardly extending cam parts 25 adjacent the plate. When the handle 24 is tilted rearwardly, the cam parts 25 come into engagement with the surface of the bench B and the mounting plate 17 is caused to swing upwardly. This permits easy insertion of the shim 20 between the top surface of the bench B and the mounting plate 17. The function of the shim 20 will later become apparent.

Where the device is designed to be manually operated handle means is provided to facilitate the ready application of manual pressure. This means may comprise a rod 26 secured to the upper side of the case 10 to project forwardly therefrom and then curve or incline downwardly. A knob or grip 27 is fixed to the forward end of the rod 26 to be conveniently engaged by the operator standing or sitting in front of the bench B.

The work penetrating means 11 is provided in the forward lower portion of the case 10 and projects downwardly beyond the aforementioned case extension 15. In the preferred construction the means 11 includes a vertically disposed rectangular block 28 fixed between the side walls of the case and provided with a vertical opening 29. See Figure 4. Bushings 30 are screwed into the upper and lower ends of the opening 29 and have their opposing end faces spaced a substantial distance apart. The hardness testing or work penetrating means 11 further includes a cylindrical block 31 slidably guided in the opening 29 above the lower bushing 30 to carry the work penetrating needle or point 32. It is desirable to make the point 32 a separate or detachable part for ready adjustment and replacement. We have shown the point 32 removably secured in a socket in the block 31 by a set screw 33. The point 32 is slidably guided in the lower bushing 30 and its sharpened lower end protrudes downwardly beyond the block 28. A boss 34 is formed on the lower end of the block 28 and presents a finished flat face surrounding the lower end of the bushing 30 to form a stop for engaging the upper surface of the workpiece, and thus limit the downward travel of the block 28. The downward travel of the point 32 relative to the block 28 is limited by the engagement of the guide block 31 with the lower bushing 30. By screwing the lower block 30 along the opening 29, the extent of normal projection of the point 32 from the boss 34 may be easily adjusted to adapt the device for testing the various materials and workpieces.

The point 32 is spring loaded so as to penetrate the surface of the workpiece some distance upon manual actuation of the machine. A relatively strong helical spring 35 is engaged under compression between the upper bushing 30 and the top of the guide block 31 to urge the point 32 downwardly and normally hold the block 31 against the lower bushing 30 as shown in Figure 4. The spring 35 holds the point 32 in the fully extended position of Figure 4 and prevents substantial relative movement between the point and the main block 28 unless the part being tested is sufficiently hard to resist penetration and downward motion of the point. The spring loading of the point 32 may be adjusted by merely screwing the upper bushing 30 along the opening 29 to change the compression in the spring 35. The threads of the opening 29 and bushings 30 are preferably quite fine so that an accurate adjustment of the testing means 11 is obtainable. A stem 36 is fixed to the block 31 and extends upwardly through the upper guide bushing 30 to cooperate with the stamping means 12 as described below.

The stamping means 12 is automatically operable to stamp the selected symbol or indicia on the work part when the hardness testing means 11 acts in a manner to indicate that the part is of the required hardness. In other words, when the work part has sufficient hardness to offer a given resistance to downward movement of the spring loaded point 32, during manual actuation of the device, the means 12 is actuated to stamp the work part. The means 11 comprises an elongate punch or die 37 slidable in a vertical opening 38 in the block 28 and projecting beyond both the upper and lower ends of the block. Axial movement of the stamp die 37 is limited by a pin 39 on the die engageable with the ends of a slot 40 in the block 28. The active lower end of the die 37 carries the selected inspection stamp, or the like, which is to be impressed on the work parts. As shown in Figure 4, the stamp die 37 is in spaced parallel relation to the penetrating point 32.

The stamping means 12 further includes a lever 41 carried by a horizontal shaft 42 extending between and supported by the side walls of the case 10. The forward arm of the lever 41 carries a hammer 43 for striking the stamping die 37. Electrically operated means serves to actuate the hammer lever 41. A solenoid 44 is secured in the upper rear portion of the case 10 and has a depending operating link or rod 45. The rod 45 is connected with the rear arm of the lever 41 by a pin and slot connection 46. Upon energization of the solenoid 44, the lever 41 is operated and the hammer 43 is swung against the stamp die 37 to drive the same against the work part. It is desirable to attach a counterweight 47 to the rear arm of the lever 41 to return the lever and the rod 45 to the original positions after each operation.

As illustrated in Figure 5, the energizing circuit for the solenoid 44 includes two power leads 48 and 49. A manually operated switch 50 for conditioning the device for operation is connected in the lead 49. An automatically operated switch 51 is also interposed in the lead 49. The switch 51 is of a type which requires only slight movement for its full operation, such switches being sold under the name "Microswitch." As such switches are well known in the various arts, the details of the switch 51 are omitted from this disclosure, it being understood that any appropriate type or class of switch may be employed. The switch 51 is mounted in the case 10 above the block 28 in a position to be controlled by the above mentioned stem 36. The operating plunger 63 of the switch 51 projects downwardly to have cooperation with the upper end of the stem 36. It is important to obtain an accurately adjusted relationship between the switch 51 and the stem 36 of the penetrating point assembly. In the construction illustrated, we have shown the switch 51 carried by an adjustable support so that it may be easily adjusted from the exterior of the case 10. A bracket 52 is pivoted on the inner surface of a side wall of the case 10 by a hinge pin 55 and is urged upwardly by a spring 53. The spring 53 may surround the switch plunger 63 and is engaged under compression between the upper end of the block 28 and the lower side of the switch 51. An adjusting screw 54 is threaded through an opening in the top wall of the case 10 and engages downwardly against the bracket 52. By simply adjusting the screw 54 the switch 51 may be moved vertically to any required position relative to the stem 36. A lock nut 56 is engaged on the adjusting screw 54 to cooperate with the case 10 for the purpose of setting or securing the screw in the selected position.

It will be seen that when the operator swings the device downwardly the engagement of the point 32 with the work part resists downward movement of the point and if the work part is of sufficient hardness the resistance of the spring 35 is overcome and the switch plunger 63 is moved against the stem 36 to actuate the switch 51 and thus close the circuit to the solenoid 44. The solenoid operates the hammer 43 and the stamp 37 makes the inspection mark on the work part.

The counting means 13 serves to count the parts which prove to have a sufficient degree of hardness, but will not count those parts which have insufficient hardness and which are not stamped. This means includes a counter 60 of any well-known type secured to the exterior of the case 10. The operating arm or lever 61 of the counter carries a rather unyielding spring wire 62. The wire 62 freely passes through an arcuate slot 66 in the wall of the case 10 to project into the path of the lever 41. When the lever 41 is actuated by the solenoid 44 its forward arm contacts and moves the wire 62 downwardly to actuate the counter 60. The counter is preferably of a type which automatically restores the arm 61 and wire 62 after each actuation. It will be noted that the counter 60 is not actuated unless and until the solenoid 44 is energized and that this does not occur unless the work part is of the proper hardness.

Means is provided for normally holding the point 32 clear of the bench B and the work-piece P. A vertical socket 70 is formed in the lower end of the block 28 and a coiled spring 71 is secured therein. The spring 71 projects beyond the lower end of the block to engage the bench or work-piece and yieldingly hold the hinged device in a position where the point 32 is free.

In preparing the device for operation a shim 20 having the same thickness as the work parts P to be tested is engaged under the mounting plate 17. This is readily accomplished by swinging the handle 24 rearwardly to raise the front end of the plate 17 so that the shim 20 may be passed under it. When a shim 20 of the same thickness as the work part P is engaged under the mounting plate 17, the face of the stamp die 37 is parallel with the surface of the work part P and the point 32 is normal to the work part when brought into engagement therewith. The device may be easily conditioned for the testing of work parts of various thicknesses by merely providing shims 20 of the same thickness under the mounting plate 17.

Assuming that the testing means 11 and the switch 51 have been adjusted as above described, the device is conditioned for operation by merely closing the switch 50. To test the hardness of a work part P, the part is placed on the bench B under the block 28 and the inspector or operator swings the case 10 downwardly by means of the handle grip 27. Sufficient manual force is applied to overcome the spring 71 and to urge the point 32 into the work part P. If the work part is excessively soft the point 32 enters the part, moving downwardly with the block 28 and the other parts associated with the case 10. When this occurs there is no relative movement between the stem 36 of the pointer assembly and the switch plunger 63 and the switch 51 remains open. Accordingly, the solenoid 44 is not energized and the stamping means 11 and counting means 12 are not operated. In the event the work part P is "medium" soft the point 32 penetrates it to a considerable extent so that the spring 29 is overcome to only a minor degree and there is but slight relative movement between the stem 36 and the switch plunger 63. In the latter case, the switch 51 is not closed and the work part is not stamped or counted. If the material of the work part P has sufficient hardness the point 32 will penetrate it to only a minor extent and thus will be effectively held against downward movement, while the downward manual pressure is exerted on the handle grip 27. In this case, the block 28 moves downwardly with respect to the point 32 and the spring 35 is overcome. The switch 51 also moves downwardly with the case 10 and the relative movement between the stem 36 and the switch plunger 63 results in closing of the switch 51. As above described, closing of the switch 51 energizes the solenoid 44 and the lever 41 is actuated to cause the hammer 43 to strike the stamp die 37. The counter 60 is simultaneously operated by the lever arm 41 so that the work part P is stamped and counted. At the completion of the operation the case 10 is swung upwardly by means of the handle 27 and the work part P is removed. A second work part is then inserted below the block 28 and the operation is repeated.

While we have referred to the device as being manually operated, it is to be understood that the invention may be embodied in forms incorporating power means for applying the force for effecting the tests and having suitable controls for such power means.

Having described only a typical form of the invention, we do not wish to be limited to the specific details herein set forth, but wish to reserve to ourselves any variations or modifications that may appear to those skilled in the art or fall within the scope of the following claims.

We claim:

1. A hardness tester comprising a case, means for moving the case toward the part to be tested, a point for penetrating the material of said part, means for mounting the point on the case for relative movement, spring means for resisting relative movement between the case and point, a stamp carried by the case for marking said part, a lever in the case for operating the stamp, electromagnetic means for actuating the lever, and a switch arranged to be closed to energize the electromagnetic means only upon a given movement of the case relative to the point.

2. A hardness tester comprising a case, manual means for moving the case toward the part to be tested, a point for penetrating the material of said part, means for mounting the point on the case for relative movement, spring means for resisting relative movement between the case and point, a stamp carried by the case for marking said part, a lever in the case for operating the stamp, electromagnetic means for actuating the lever, counting means operated by the lever, and a switch arranged to be closed to energize the electromagnetic means only upon a given movement of the case relative to the point.

3. A hardness tester comprising a case, means supporting the case for movement toward the part to be tested, a point slidably carried by the case and arranged to contact the part, a spring yieldingly resisting relative movement between the case and point, a stamp carried by the case for marking the part, a stem on the point, lever means carried by the movable case, a hammer on the lever means for operating the stamp, electromagnetic means in the case for operating the lever means, and a switch for controlling the electromagnetic means arranged to be operated to energize the electromagnetic means by cooperation with the stem if the part is of sufficient hardness to limit penetration by the point when the case is moved toward the part.

4. A hardness tester comprising a case, hinge means supporting the case so that it may be manually moved toward the part to be tested, a point projecting from the case to contact the part, the case being movable with respect to the point when the latter is in engagement with the part, a spring for transmitting force from the case to the point, counting means carried by the case, stamp means carried by the case for marking the part, lever means in the hinged case for operating the counting means and stamp means, and means for operating the lever means when the part is of sufficient hardness to limit penetration of the point into the part upon the case being moved toward the part, the last named means including a solenoid for actuating the lever means, a stem on the point and a switch on the case cooperating with the stem to be operated thereby to energize the solenoid upon a given yielding of the spring.

5. A hardness tester comprising a case, means supporting the case for movement toward the part to be tested including a support for the part, a plate hingedly connected with the case, a shim of the same thickness as the part engaged between the plate and the support, means securing the plate to the support to retain the shim between the support and plate, a point slidably mounted in the case to project from its lower side for contact with the part, spring means for resisting downward movement of the case relative to the point, a stamp carried by the case to project from its lower side to engage the part, a counter, a lever in the case for operating the stamp and counter, solenoid means for operating the lever, a stem extending upwardly from the point, and a switch in the case cooperating with the stem to be closed thereby to energize the solenoid means upon a given downward movement of the case relative to the point.

6. A hardness tester comprising a case, means supporting the case for manual movement toward the part to be tested including a support for the part, a plate hingedly connected with the case, spring loaded means securing the plate to the support and yieldable to allow limited movement of the plate relative to the support, a shim of the same thickness as the part engaged between the plate and the support, cam means on the plate for cooperating with the support to move the plate relative to the support and thereby permit ready placement and removal of the shim, a point slidably mounted in the case to project from its lower side for contact with the part, spring means for resisting downward movement of the case relative to the point, a stamp carried by the case to project from its lower side to engage the part, a counter, a lever in the case for operating the stamp and counter, solenoid means for operating the lever, a stem extending upwardly from the point, and a switch in the case cooperating with the stem to be closed thereby to energize the solenoid means upon a given downward movement of the case relative to the point.

7. A hardness tester comprising a case, means supporting the case for manual movement toward the part to be tested including a support for the part, a plate hingedly connected with the case, a shim of the same thickness as the part engaged between the plate and the support, and means securing the plate to the support, a handle projecting forwardly from the case so that the case may be swung downwardly toward the support, a point slidably mounted in the case to project from its lower side for contact with the part, spring means for resisting downward movement of the case relative to the point, a stamp carried by the case to project from its lower side to engage the part, a counter, a lever in the case for operating the stamp and counter, solenoid means for operating the lever, a stem extending upwardly from the point, and a switch in the case cooperating with the stem to be closed thereby to energize the solenoid means upon a given downward movement of the case relative to the point.

STIG CHRISTENSEN.
WILLIAM G. ROSENBERG.
JAY D. SWIFT.

REFERENCES CITED

The following references are of record in the file of this patent:

UNITED STATES PATENTS

| Number | Name | Date |
| --- | --- | --- |
| 1,839,093 | Geyer et al. | Dec. 29, 1931 |
| 2,398,605 | Vlcek, Jr. | Apr. 16, 1946 |